(12) United States Patent  
Chapman

(10) Patent No.: US 12,250,354 B1  
(45) Date of Patent: Mar. 11, 2025

(54) DUAL INFRARED GLOSS EFFECT

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/540,807

(22) Filed: Dec. 14, 2023

(51) Int. Cl.
| | |
|---|---|
| H04N 1/32 | (2006.01) |
| B41M 3/00 | (2006.01) |
| B41M 3/14 | (2006.01) |
| B41M 5/00 | (2006.01) |
| H04N 1/00 | (2006.01) |
| H04N 1/54 | (2006.01) |
| H04N 1/60 | (2006.01) |

(52) U.S. Cl.
CPC ........ *H04N 1/32203* (2013.01); *B41M 3/008* (2013.01); *B41M 3/148* (2013.01); *B41M 5/0023* (2013.01); *H04N 1/00883* (2013.01); *H04N 1/32309* (2013.01); *H04N 1/32352* (2013.01); *H04N 1/54* (2013.01); *H04N 1/6027* (2013.01); *B41M 2205/42* (2013.01); *H04N 2201/3233* (2013.01)

(58) Field of Classification Search
CPC .......... H04N 1/32144–32352; H04N 1/00883; H04N 1/6027; H04N 2201/3233; B41M 3/008; B41M 3/148; B41M 5/0023; B41M 2205/42

See application file for complete search history.

(56) References Cited

U.S. PATENT DOCUMENTS

| | | | |
|---|---|---|---|
| 7,639,400 B2 | 12/2009 | Hains | |
| 7,852,515 B2 * | 12/2010 | Eschbach | H04N 1/32352 358/1.1 |
| 8,310,718 B2 | 11/2012 | Chapman et al. | |
| 9,088,736 B2 * | 7/2015 | Miller | H04N 1/60 |
| 9,100,592 B2 * | 8/2015 | Chapman | C12N 15/1048 |

(Continued)

OTHER PUBLICATIONS

"Xerox® FreeFlow® Core", Version 7.0, Feb. 2023, 702P08983.

*Primary Examiner* — Scott A Rogers  
(74) *Attorney, Agent, or Firm* — Ortiz & Lopez, PLLC; Kermit D. Lopez; Luis M. Ortiz

(57) ABSTRACT

A method, system and apparatus for rendering a gloss effect on a recording medium, can involve rendering a foreground pattern using a first ink composition comprising infrared absorbing colors, wherein said first ink is lightened with lightening parameters by the addition of paper white holes and rendering a background pattern using a second ink composition comprising a process or spot color, wherein said second ink is darkened with darkening parameters by the addition of infrared absorbing colors that have different amounts of infrared absorbing colors than that of the first ink composition. The lightening parameters and the darkening parameters are adjustable to ensure that the first and second inks appear approximately the same at printed sizes. Anisotropic properties can be introduced to the first and second inks, causing non-uniformity in their reflection of light in different directions when viewed under a light source, thereby creating a gloss effect renderable on a recording medium. An infrared (IR) signal can be embedded within the gloss effect to enable detection of the gloss effect using an IR sensor or an IR device.

20 Claims, 11 Drawing Sheets

(56) References Cited

U.S. PATENT DOCUMENTS

| | | | |
|---|---|---|---|
| 9,106,847 B2 * | 8/2015 | Miller | ................ H04N 1/00843 |
| 9,148,546 B2 | 9/2015 | Miller et al. | |
| 9,193,201 B2 * | 11/2015 | Chapman | ........... H04N 1/32352 |
| 9,237,253 B2 | 1/2016 | Chapman et al. | |
| 9,415,606 B2 * | 8/2016 | Chapman | ........... H04N 1/32352 |
| 9,444,969 B2 * | 9/2016 | Miller | ..................... H04N 1/60 |
| 11,390,102 B1 | 7/2022 | Chapman | |
| 2005/0156048 A1 | 7/2005 | Reed et al. | |
| 2010/0195160 A1 | 8/2010 | Schulze-Hagenest et al. | |

\* cited by examiner

DUAL INFRARED GLOSS EFFECT

TECHNICAL FIELD

Embodiments are related to image processing methods, systems and devices. Embodiments also relate to the field of specialty imaging techniques. Embodiments further relate to the creation and rendering of specialty effects, which may be incorporated into rendered documents. Embodiments further relate to improved gloss effects including a gloss dual infrared gloss effect.

BACKGROUND

Security is an important requirement in many document production applications. In situations such as official or government document printing, event ticket printing, financial instrument printing and the like, many documents must be protected against copying, forging and/or counterfeiting. To accomplish this, printed documents often include security marks or security features that serve to prevent counterfeiting and/or identify a document as original.

Thus, in security applications, it may be desirable to add information to a document in the form of a security mark or a security feature that may prevent or hinder alterations and counterfeiting. Specialty imaging has been used, conventionally, in printed materials to provide fraud protection and anti-counterfeiting measures for such security applications. Some examples can be found in prescriptions, contracts, documents, coupons, and tickets. Typically, several specialty-imaging techniques may be used at various positions in a document. In addition, these security elements may in some cases conflict with the overall aesthetics of the document.

Specialty imaging can use standard media such as papers inks and toners, which stands in contradistinction to security printing solutions currently in the marketplace that require special (expensive) materials. An example of a document that may require specialty imaging features for security purposes is a prescription where a pharmacist would like to be able to have a high level of confidence that the document is genuine.

Examples of specialty imaging effects include, but are not limited to, features such as the Xerox® MicroText Mark, Xerox® Correlation Mark, Xerox® GlossMark® Xerox® Infrared Mark and Xerox® Fluorescent Mark, which add security to static and variable information (VI) jobs by making it difficult to counterfeit them. Using multiple effects-including visible ones-on an application makes reproducing it more costly than purchasing the original. Specialty imaging can also be used to add visual interest and sophistication to print jobs. Specialty imaging may also be used to add reflective text to enhance photos, illustrations and colored backgrounds.

Conventional digital printing systems sometimes offer many of the above specialty security features (e.g., Gloss-mark, specialty toners (e.g., IR, UV, fluorescent), etc.). One type of specialty imaging feature or effect which has been implemented in security printing applications is "Micro Gloss" or "MicroGloss" (or Artistic Black for VIPP). The Micro Gloss effect can be implemented in a manner in which depending upon the light source and the observer's angle, a watermark can appear and disappear. The Micro Gloss effect is especially popular with customers because it does not require a special tool (e.g. ultraviolet light or magnification) to decode for viewing and is especially effective for anti-copying. The Micro Gloss effect can also be printed using standard media and toners instead of requiring special (expensive) materials.

FIG. 1 illustrates an image 10 of a conventional micro gloss effect. FIG. 2 illustrates an image 20 of an infrared micro gloss effect based on four inks. FIG. 3 illustrates an image 30 depicting an infrared micro gloss effect based on four inks. The Micro Gloss effect that works by having two different toner pile heights. It is limited to small sizes (e.g., as shown in FIG. 1). The micro gloss effect shown in FIG. 2 and FIG. 3 worked with four inks to create a Micro Gloss watermark and an IR watermark in the same space. This is not a dual effect but is based on two different overlapping watermarks. These effects can function adequately in some situations, but the IR mark has a low resolution and takes up quite a bit of space. The image 20 shown in FIG. 2 is a zoomed image of the labeled section 32 depicted in FIG. 3.

It desirable for specialty imaging watermarks to have a visible and invisible dual watermark. The visual part allows verification without any special tools or decoders and the machine-readable invisible watermark can assist in deterring counterfeiting. Even if the forger or counterfeiter was able create a gloss effect, they may not even be aware of the invisible watermark. This feature is currently not available for gloss marks. Micro Gloss with IR (Infrared) is available but possesses limitations.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide for improved image-processing methods, systems, and devices.

It is another aspect of the embodiments to provide methods, systems and devices for generating improved specialty imaging effects.

It is a further aspect of the embodiments to provide methods, systems and devices for generating and rendering an improved gloss effect on a recording medium.

It is also an aspect of the embodiments to provide methods, systems, and devices for creating and rendering a gloss effect with a foreground and background composed of two different pattern inks which appear with approximately the same color and pattern at printed sizes.

The aforementioned aspects and other objectives and advantages can now be achieved as described herein. In an embodiment, a method for rendering a gloss effect on a recording medium, can involve: rendering a foreground pattern using a first ink composition comprising infrared absorbing colors, wherein said first ink is lightened with lightening parameters by the addition of paper white holes; rendering a background pattern using a second ink composition comprising a process or spot color, wherein said second ink is darkened with darkening parameters by the addition of infrared absorbing colors comprising different amounts of infrared absorbing colors than that of the first ink composition; adjusting the lightening parameters and the darkening parameters to ensure that the first and second inks appear approximately the same at printed sizes; introducing anisotropic properties to the first and second inks, causing non-uniformity in their reflection of light in different directions when viewed under a light source, thereby creating a gloss effect renderable on a recording medium; and embedding an infrared (IR) signal within the gloss effect, enabling detection of the gloss effect using an IR sensor or an IR device. Note that in the method above, only one pattern ink has K (e.g., black) in it and this is the same ink that has white paper holes.

An embodiment of the method can involve rendering the gloss effect on the recording medium.

In an embodiment of the method, the first ink can comprise micro-sized paper white holes, further enhancing the lightening effect, and wherein the second ink comprises a process or spot color that is matched to achieve a visually similar appearance at printed sizes.

An embodiment of the method can involve adjusting the lightening and darkening parameters by color matching similar to facilitate an integration of the foreground and background patterns.

In an embodiment of the method, the anisotropic properties of the first and second inks can be achieved through a manipulation of a particle size, a particle shape, or a particle orientation, resulting in distinct visual effects when under a light source.

In an embodiment of the method, the infrared absorbing colors added to the first and second inks can be selected to enhance the darkening effect of the second ink and the lightening effect of the first ink.

In an embodiment of the method, the darkening effect of the second ink and the lightening effect of the first ink can facilitate a similarity in appearance at printed sizes of the recording medium.

In an embodiment of the method, the gloss effect can be viewable by tilting a printed substrate upon which the gloss effect is rendered under a light source, which can reveal the anisotropic properties of the first and second inks.

In an embodiment, a system for rendering a gloss effect on a recording medium, can include at least one processor and a memory, the memory storing instructions to cause the at least one processor to perform: rendering a foreground pattern using a first ink composition comprising infrared absorbing colors, wherein said first ink is lightened with lightening parameters by the addition of paper white holes; rendering a background pattern using a second ink composition comprising a process or spot color, wherein said second ink is darkened with darkening parameters by the addition of infrared absorbing colors comprising different amounts of infrared absorbing colors than that of the first ink composition; adjusting the lightening parameters and the darkening parameters to ensure that the first and second inks appear approximately the same at printed sizes; introducing anisotropic properties to the first and second inks, causing non-uniformity in their reflection of light in different directions when viewed under a light source, thereby creating a gloss effect renderable on a recording medium; and embedding an infrared (IR) signal within the gloss effect, enabling detection of the gloss effect using an IR sensor or an IR device. Note that in the system described above, only one pattern ink may have K (e.g., black) therein, and this is the same ink that has white paper holes.

In an embodiment of the system, the instructions can further cause the at least one processor to perform rendering the gloss effect on the recording medium.

In an embodiment of the system, the first ink can comprise micro-sized paper white holes, which can further enhance the lightening effect, and the second ink can comprise a process or spot color that can be matched to achieve a visually similar appearance at printed sizes.

In an embodiment of the system, the instructions can further cause the at least one processor to perform adjusting the lightening and darkening parameters by color matching similar to facilitate an integration of the foreground and background patterns.

In an embodiment, the anisotropic properties of the first and second inks can be achieved through a manipulation of a particle size, a particle shape, or a particle orientation, which can result in distinct visual effects when under a light source.

In an embodiment of the system, the infrared absorbing colors added to the first and second inks can be selected to enhance the darkening effect of the second ink and the lightening effect of the first ink.

In an embodiment of the system, darkening effect of the second ink and the lightening effect of the first ink can facilitate a similarity in appearance at printed sizes of the recording medium.

In an embodiment of the system, gloss effect can be viewable by tilting a printed substrate upon which the gloss effect is rendered under a light source, which can reveal the anisotropic properties of the first and second inks.

In an embodiment, an apparatus for rendering a gloss effect on a recording medium, can include: a foreground pattern electronically created using a first ink composition comprising infrared absorbing colors, wherein said first ink is lightened with lightening parameters by the addition of paper white holes; a background pattern electronically created using a second ink composition comprising a process or spot color, wherein said second ink is darkened with darkening parameters by the addition of infrared absorbing colors comprising different amounts of infrared absorbing colors than that of the first ink composition, wherein the lightening parameters and the darkening parameters are adjustable to ensure that the first and second inks appear approximately the same at printed sizes; anisotropic properties introduced to the first and second inks, causing non-uniformity in their reflection of light in different directions when viewed under a light source, thereby creating a gloss effect renderable on a recording medium; and an infrared (IR) signal embedded within the gloss effect, enabling detection of the gloss effect using an IR sensor or an IR device. The gloss effect can be rendered on a recording medium. Note that in the apparatus described above, only one pattern ink may have K (e.g., black) in it and this is the same ink that has white paper holes.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Figure 1:
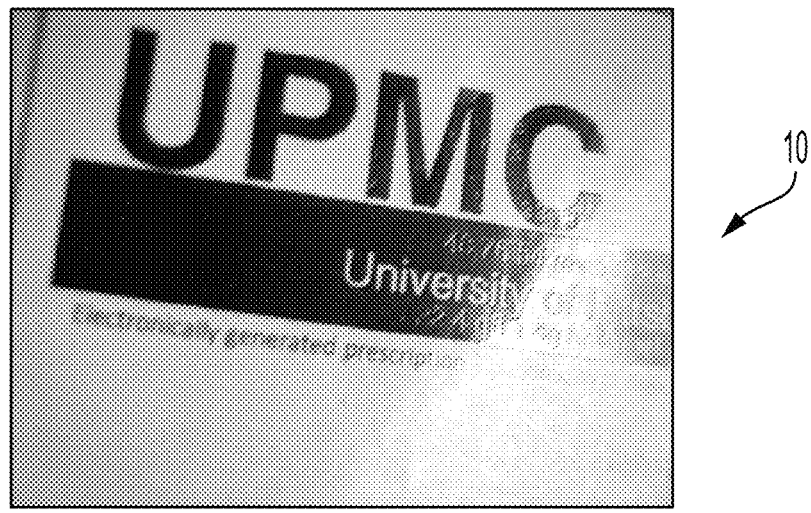
FIG. 1 illustrates an image of a conventional micro gloss effect.
Figure 2:
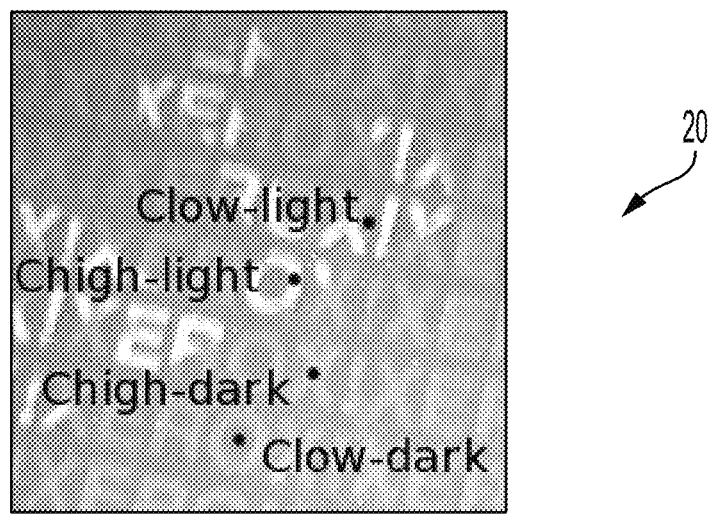
FIG. 2 illustrates an image of an conventional infrared micro gloss effect based on four inks.
Figure 3:
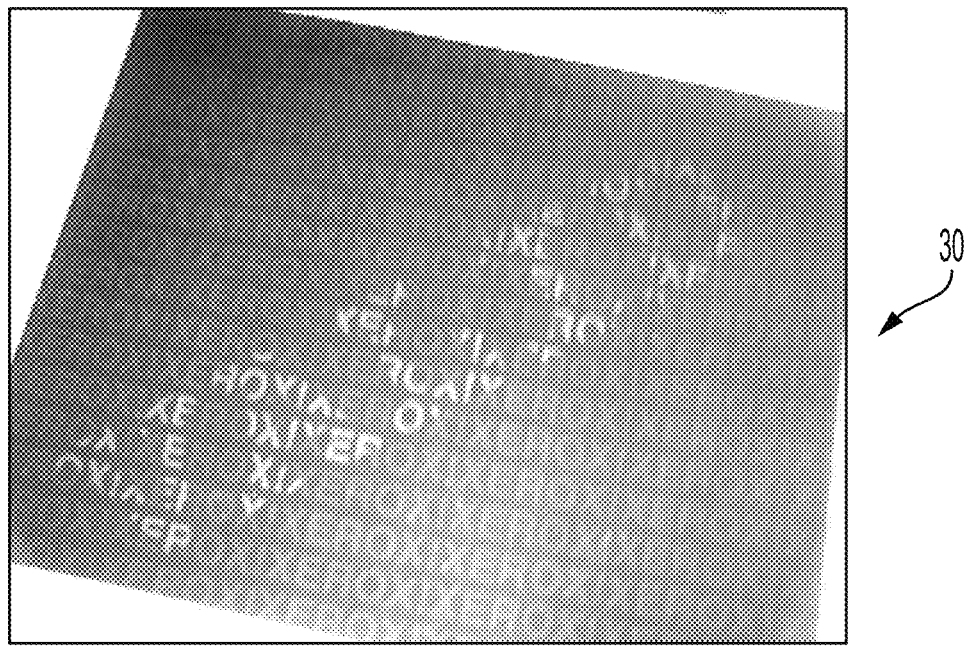
FIG. 3 illustrates an image of a conventional infrared micro gloss effect based on four inks.

It is important to note that while the drawings and figures presented herein are illustrated in black and white, they might have originally been created and displayed in color. As a result, those skilled in the art will understand that even though the images and figures may not display color, they may actually depict features in color.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets."

The term "data" refers herein to physical signals that indicate or include information. An "image," as a pattern of physical light or a collection of data representing the physical light, may include characters, words, and text as well as other features such as graphics.

A "digital image" can be by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

The term L*a*b (also referred to as Lab or LAB) as utilized herein relates to the CIELAB color space (L*a*b), which is a color space defined by the International Commission on Illumination (CIE). L*a*b It expresses color as three values: L* for perceptual lightness and a* and b* for the four unique colors of human vision: red, green, blue and yellow. CIELAB was intended as a perceptually uniform space, where a given numerical change corresponds to a similar perceived change in color. While the LAB space is not truly perceptually uniform, it nevertheless is useful in industry for detecting small differences in color.

The term CMYK as utilized herein relates to the CMYI color model, wherein CYMK refers to the four ink plates used: cyan, magenta, yellow, and key (black). The CMYK model works by partially or entirely masking colors on a lighter, usually white, background. The ink reduces the light that would otherwise be reflected. Such a model is considered subtractive because inks "subtract" the colors red, green and blue from white light. White light minus red leaves cyan, white light minus green leaves magenta, and white light minus blue leaves yellow. An example of an additive color model is the RGB color model in which the red, green, and blue primary colors of light are added together to reproduce a broad array of colors. "RGB" relates to the three primary colors, red, green and blue. RGB (i.e., the RGB color model) can be used for sensing, representation, and display of images in electronic systems, such as televisions and computers.

The term "watermark" as utilized herein can relate to a piece of a transparent text, image, logo or other markings that can be applied to media (e.g., a document, paper, a photo, an image, etc.), which can make it more difficult to copy or counterfeit the media (to which the watermark is applied through security printing) or use it without permission. A "watermark" can be a special-purpose text or picture that can be printed across one or more pages. For example, one can add a word like Copy, Draft, or Confidential as a watermark instead of stamping it on a document before distribution.

The disclosed embodiments relate to an enhanced imaging effect for a watermark, composed of both foreground and background elements crafted from two distinct pattern inks. These inks can be intentionally selected to exhibit a similar color and pattern appearance when printed at various sizes. One of the inks can undergo a lightening process through the incorporation of, for example, paper white holes and can be simultaneously darkened using infrared absorbing colors. A goal is to balance the lightening and darkening effects, ensuring that the first and second inks visually appear nearly identical. The second ink, instead of utilizing paper, can employ a process or spot color. Tools such as, for example, Xerox's CTK (color tool kit) can be employed to precisely match these colors, akin to the halftoning process. Note that achieving a similar result to Xerox's CTK (Color Tool Kit) can be accomplished using various other tools and software solutions designed for color matching and manipulation.

Notably, these inks possess distinct anisotropic properties in how they reflect light. This characteristic can create a gloss effect when the printed material is tilted under a light source, particularly due to the varying ways in which the inks interact with and reflect light. Additionally, both inks can incorporate an infrared (IR) signal within the watermark, adding an additional layer of security and uniqueness to the printed material.

Figure 4:
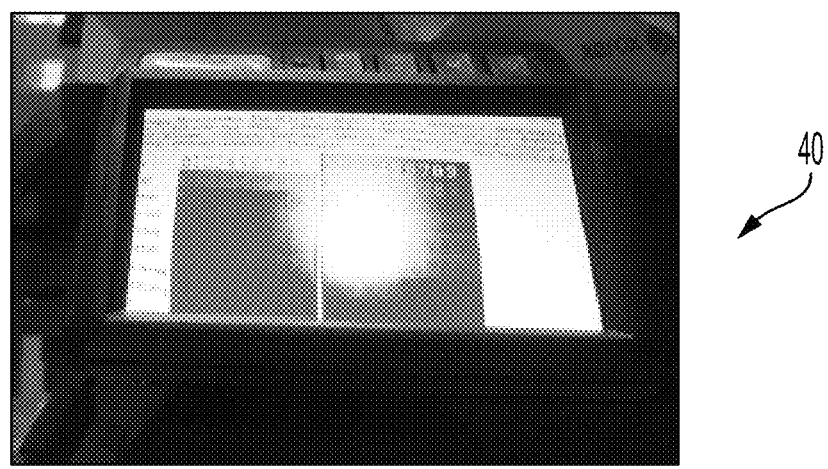
FIG. 4 illustrates an image of a gloss effect with improved IR resolution based on two inks with dual properties, in accordance with an embodiment.

FIG. 4 illustrates an image 40 of a gloss effect with improved IR resolution based on two inks with dual properties, in accordance with an embodiment. The gloss effect is shown in FIG. 4 as displayed via a computer monitor. The IR resolutions of the gloss effect shown in image 40 was created by going from four inks to two inks with dual properties. This gloss effect was based on a combination of Micro Gloss and IR using only standard media and toners/inks.

An improved gloss effect can be created based on the following methodology:

1) Select a common base color for both pattern inks (e.g., CMYK 255 0 0 0)
2) Select a common geometric pattern for both pattern inks
3) Write a background base color for pattern ink 1 (e.g., yellow)
4) Write opaquely the color and patterns from steps 1 and 2 on the output of step 3 to create pattern ink 1
5) Darken the color of step 1 with infrared absorbing inks (e.g., black)
6) Write a background base color for pattern ink 2 (e.g., white or paper)
7) Write opaquely the pattern from step 2 and the color of step 5 on the output of step 6 to create pattern ink 2
8) Write an e.g., textbox from pattern ink 2
9) Erase the text inside the textbox with pure white
10) Write the text with pattern ink 1
11) Print on media (e.g., glossy media)

Figure 5:
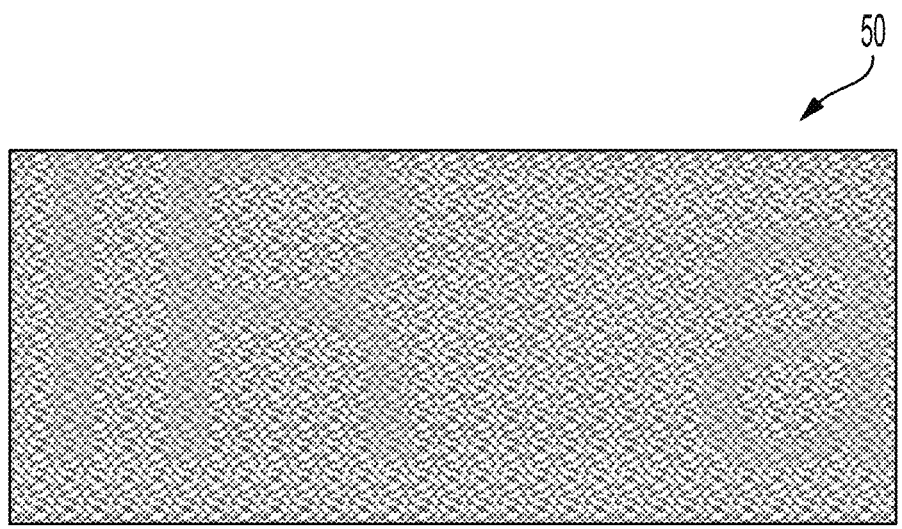
FIG. 5 illustrates an image of a zoomed dual gloss effect with IR resolution, in accordance with an embodiment.

FIG. 5 illustrates an image 50 of a zoomed dual gloss effect with IR resolution, in accordance with an embodiment. The image 50 shown in FIG. 5 can be created as a result of implementation of the above steps/operations. In the image 50, the letters I R and a are shown in the zoomed gloss effect shown. The dual gloss effect shown in image 50 in FIG. can be created using the above methodology for configuring an improved gloss effect, suitable for use as or with a watermark.

Note that in the methodology described above, only one pattern ink has K in it and this is the same ink that has white paper holes. Zooming in on the image 50 shown in FIG. 5, one ink is cyan and yellow and the other is cyan with 25% black and white/paper. In the context provided above. "K" can represent black ink. In color printing, the CMYK model is commonly used, where "K" stands for black. The CMYK model can include four color channels: Cyan (C), Magenta (M), Yellow (Y), and Key (K), where "Key" can refer to the black channel. So, when we refer to, for example, "pattern ink 2 has paper/white and K." this can indicate that the second ink pattern includes black ink along with paper or white elements.

Figure 6:
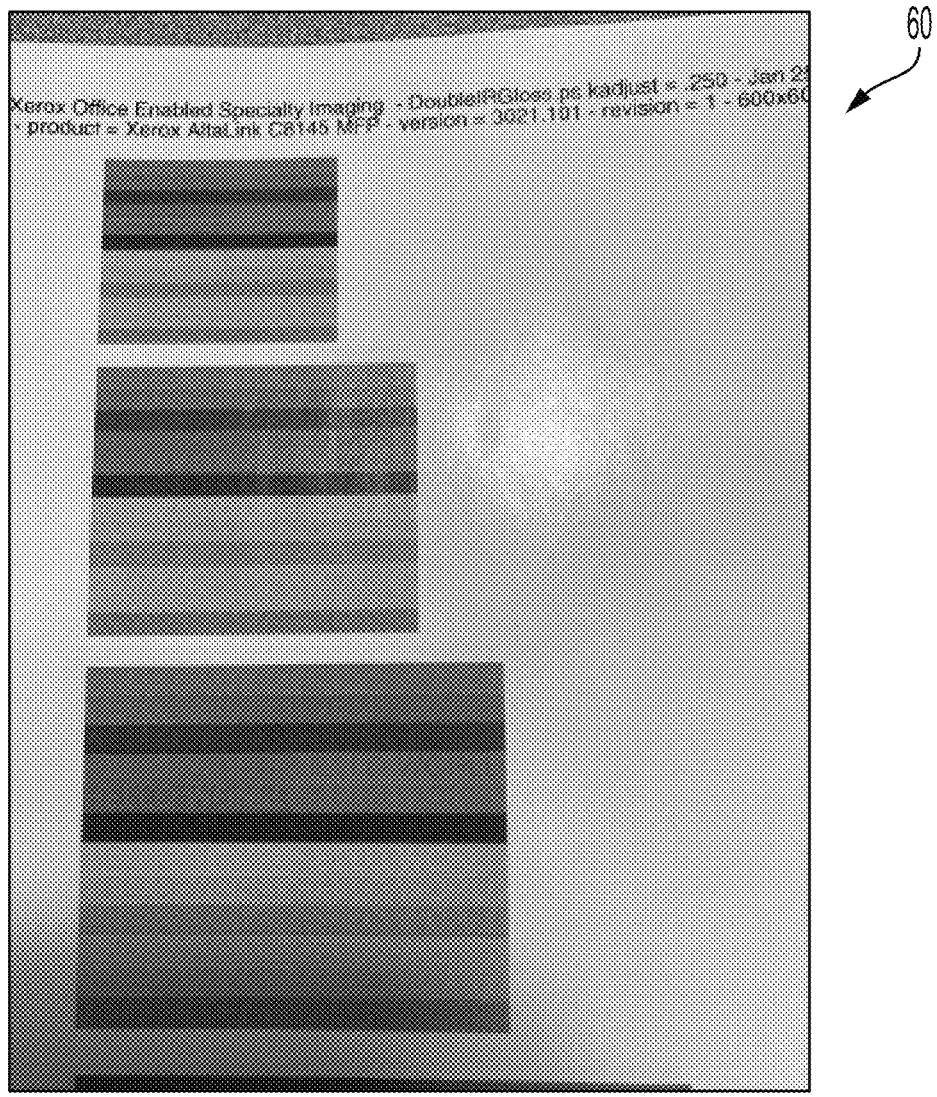
FIG. 6 illustrates an image of a swatch sheet at angle 1, in accordance with an embodiment.
Figure 7:
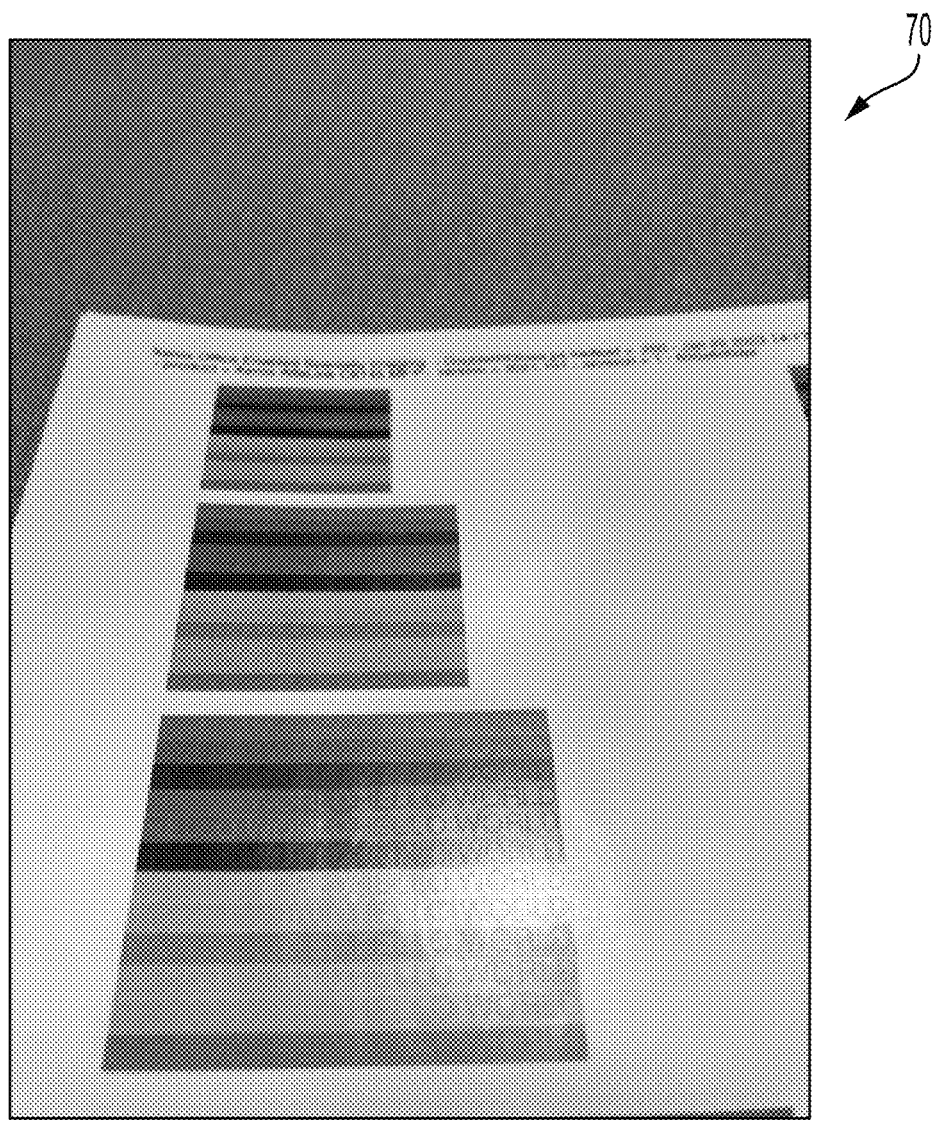
FIG. 7 illustrates an image of a swatch sheet at angle 2, in accordance with an embodiment.

FIG. 6 illustrates an image 60 of a swatch sheet at angle 1, in accordance with an embodiment. FIG. 7 illustrates an image 70 of a swatch sheet at angle 2, in accordance with an embodiment. The images shown in FIG. 6 and FIG. 7 are images of the same sheet of media at two angles. To be considered working, it must be mostly invisible at one angle and visible at another. The $4^{th}$ magenta patch down in the group near the bottom clearly demonstrates that the gloss effect shown in in the images 60 and 70 in FIG. 6 and FIG. 7 works.

FIG. 6 presents the image 60 of the swatch sheet captured from angle 1, as per an example embodiment. Similarly, FIG. 7 displays an image 70 of the same swatch sheet, but from angle 2, in accordance with the embodiment. An important observation here is that these images, depicted in both FIG. 6 and FIG. 7, showcase the same sheet of media but from two different angles. The functionality is deemed effective when the sheet appears mostly invisible from one angle and becomes visible from another angle. A noteworthy example validating this gloss effect is the fourth magenta patch down in the group near the bottom. This specific patch, as evident in both images 60 and 70 in FIG. 6 and FIG. 7, distinctly illustrates the successful operation of the gloss effect.

Figure 8:
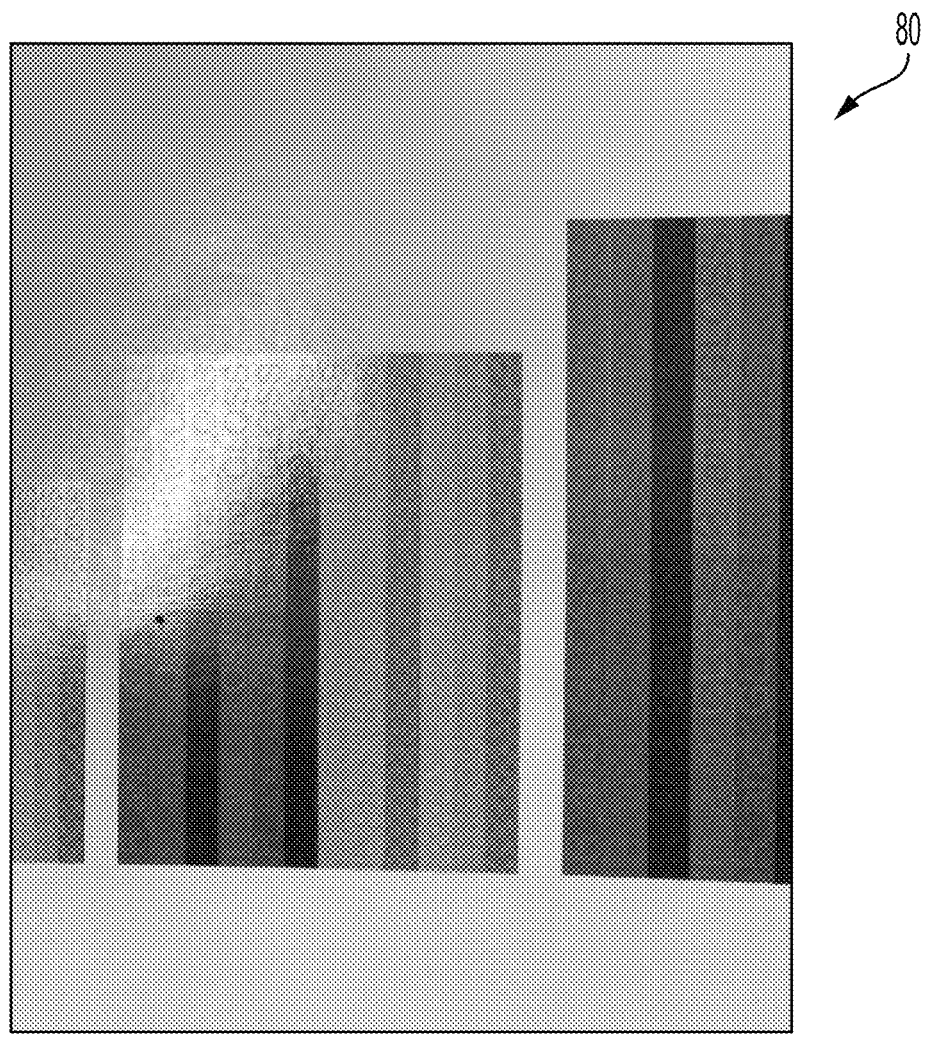
FIG. 8 illustrates an image of a gloss effect, in accordance with an embodiment.
Figure 9:
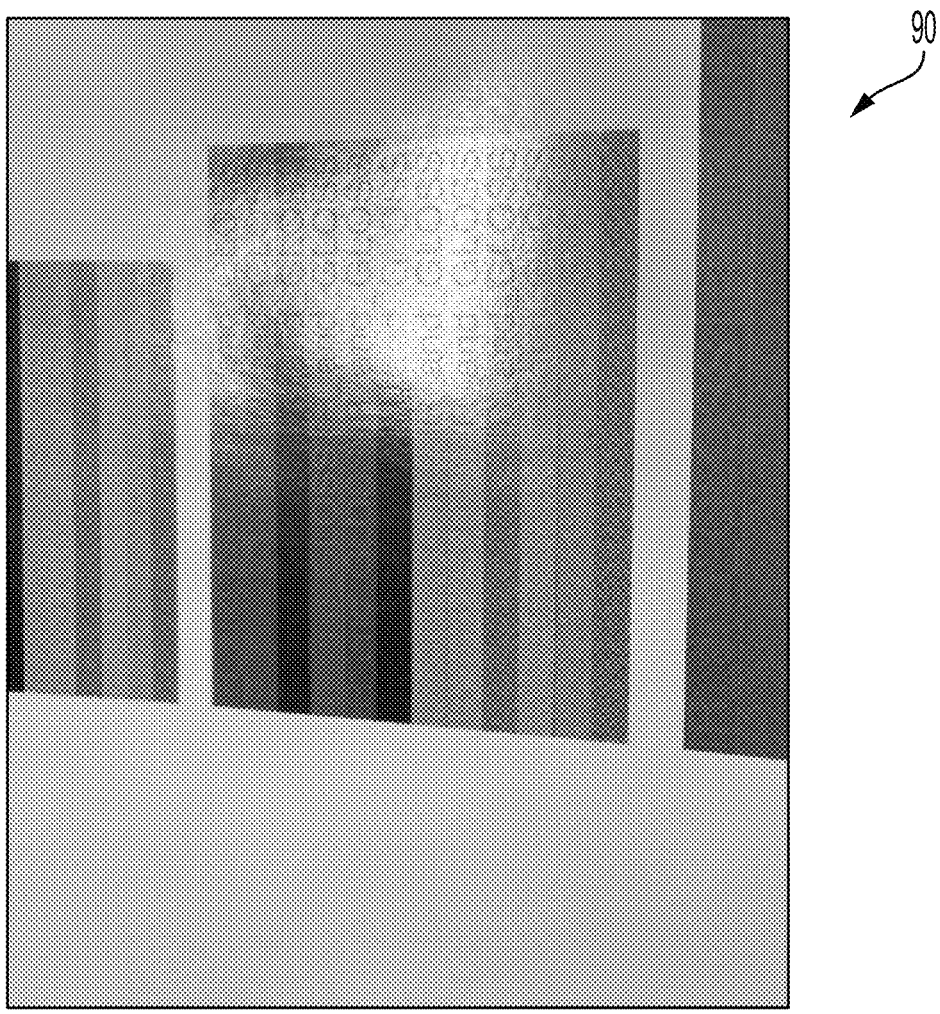
FIG. 9 illustrates another image of a gloss effect, in accordance with an embodiment.
Figure 10:
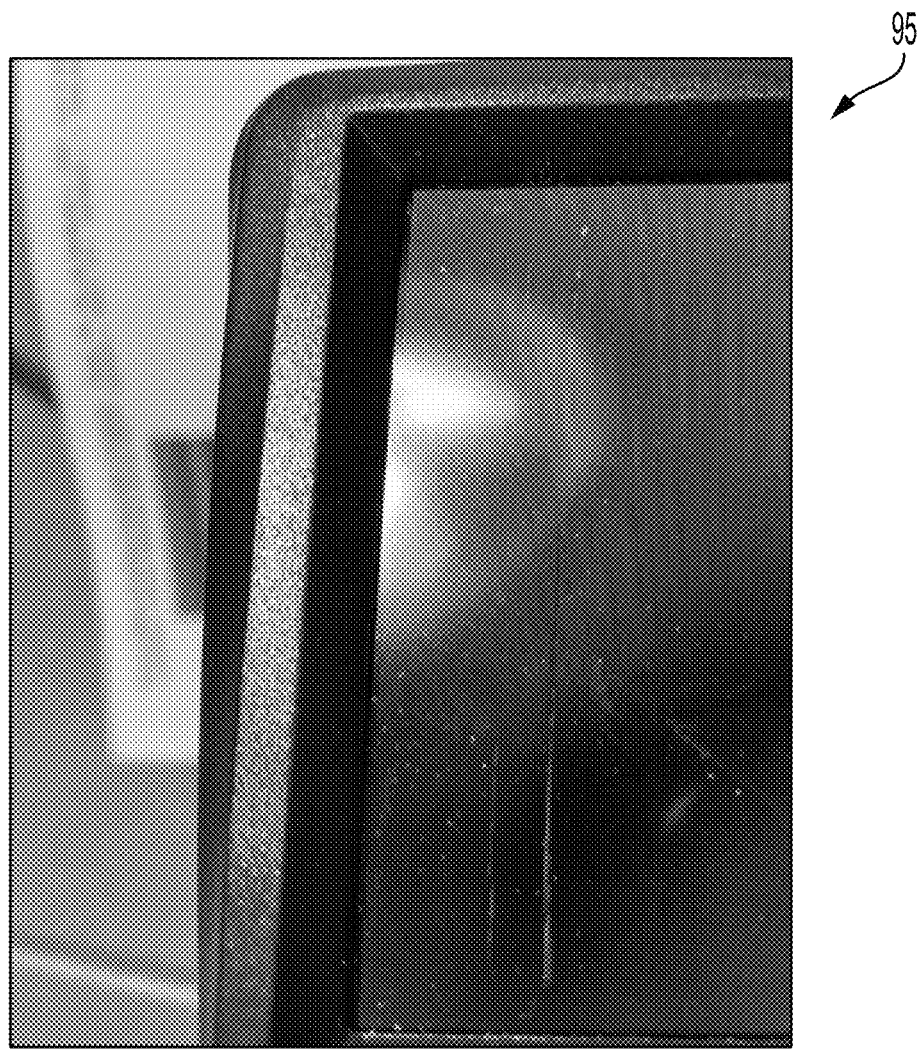
FIG. 10 illustrates an image of an IR effect on the same sheet of paper as used in the images depicted in FIG. 8 and FIG. 9, in accordance with an embodiment.

FIG. 8 illustrates an image 80 of a gloss effect, in accordance with an embodiment. FIG. 9 illustrates another image 90 of a gloss effect, in accordance with an embodiment. FIG. 10 illustrates an image 95 of an IR effect on the same sheet of paper as used in the images depicted in FIG. 8 and FIG. 9, in accordance with an embodiment.

Figure 11:
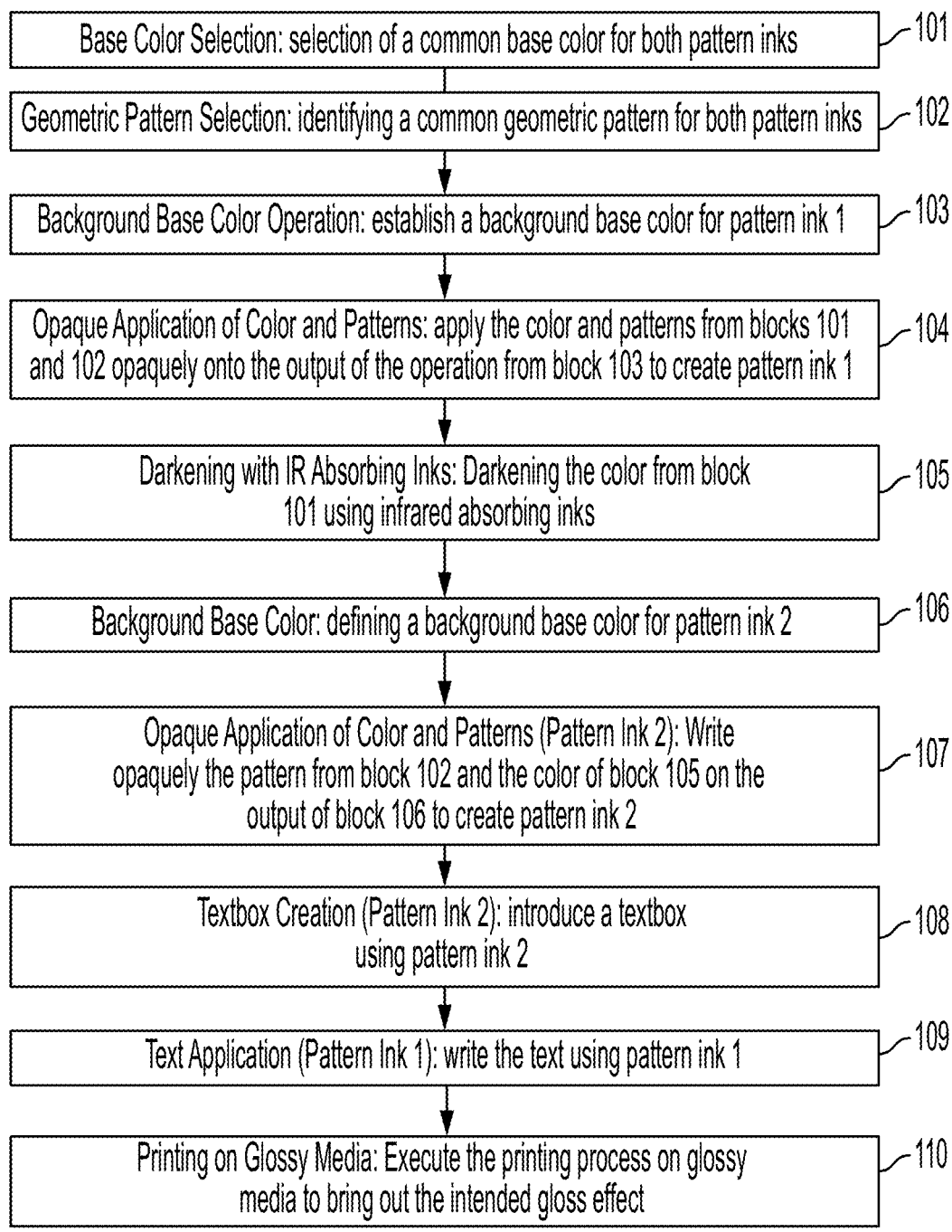
FIG. 11 illustrates a high-level flow chart of operation depicting logical operational steps of a method for configuring a dual infrared gloss effect in accordance with an embodiment.

FIG. 11 illustrates a high-level flow chart of operation depicting logical operational steps of a method 100 for configuring a dual IR gloss effect, in accordance with an embodiment. At shown at block 101, a base color selection step or operation can be implemented involving selection of a common base color for both pattern inks, such as CMYK 255 0 00. Next, as depicted at block 102, a geometric pattern selection step or operation can be implemented involving identifying a common geometric pattern for both pattern inks. Then, as indicated at block 103 a background base color operation (Pattern Ink 1) can be implemented involving establishing a background base color for pattern ink 1, for example, yellow.

Thereafter, a step or operation involving an opaque application of color and patterns (Pattern Ink 1) can be implemented as shown at block 104 by applying the color and patterns from blocks 101 and 102 opaquely onto the output of the operation shown at block 103 to create pattern ink 1. Then, as shown at block 105, a step or operation for darkening with IR absorbing inks can be implemented, which can involve darkening the color from block 101 using infrared absorbing inks, such as black. Thereafter, as shown at block 106 a background base color (Pattern Ink 2) can be implemented involving defining a background base color for pattern ink 2, which could be white or the color of the paper.

Next, as shown at block 107, a step or operation for the opaque application of color and patterns (Pattern Ink 2) can be implemented, which can involve writing opaquely the pattern from block 102 and the color of block 105 on the output of block 106 to create pattern ink 2. Next, as shown at block 108, a textbox creation (Pattern Ink 2) operation can be implemented which involves introducing a a textbox using pattern ink 2. Then, as indicated at block 109, a text erasure operation can be implemented, which involves erasing the text inside the text box using pure white. A text application (Pattern Ink 1) can be then implemented as shown at block 110 involving writing the text using pattern ink 1. Thereafter, as depicted at block 111, an operation for printing on media (e.g., gloss media) can be implemented, which involves executing the printing process on glossy media to bring out the intended gloss effect. Note that printing on glossy media is not required but can improve the gloss effect.

The method 100, involving careful selection of colors, patterns, and strategic application techniques, can result in an improved gloss effect suitable for watermarking applications. The combination of pattern inks and their application on a glossy surface contributes to a visually appealing and distinctive watermark with enhanced visibility and subtlety.

The method 100 can be applied to create a gloss effect. In method 100, the gloss effect can involve a foreground and background, both using two distinct pattern inks that visually appear to be the same color and pattern at printed sizes. One of the inks can undergo a lightening process through the addition of paper white holes and a darkening process through the incorporation of infrared absorbing colors. The combination of lightening and darkening is carefully calibrated to achieve a visual similarity between the first and second inks.

Additionally, the other ink in the gloss effect utilizes a process or spot color instead of paper. To ensure color matching akin to halftoning, a computer program, such as a color toolkit, is employed. The inks in this method possess different anisotropic properties, meaning they exhibit non-uniformity in different directions when reflecting light. This anisotropy creates the gloss effect, particularly noticeable when tilting the printed material under a light source. Furthermore, an embedded infrared (IR) signal can be integrated into the same gloss effect, adding a functional aspect to the visual enhancements.

Figure 12:
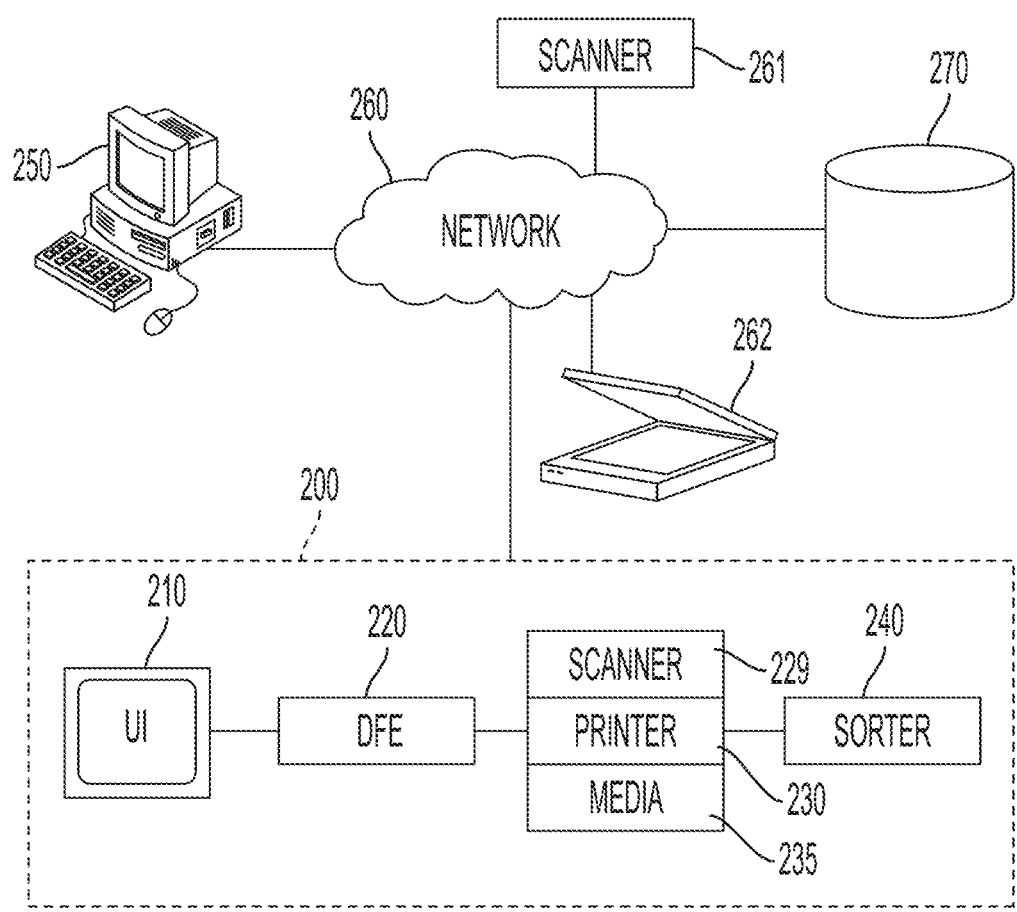
FIG. 12 illustrates a block diagram of an example printing system suitable for implementing one or more of the disclosed embodiments.
Figure 13:
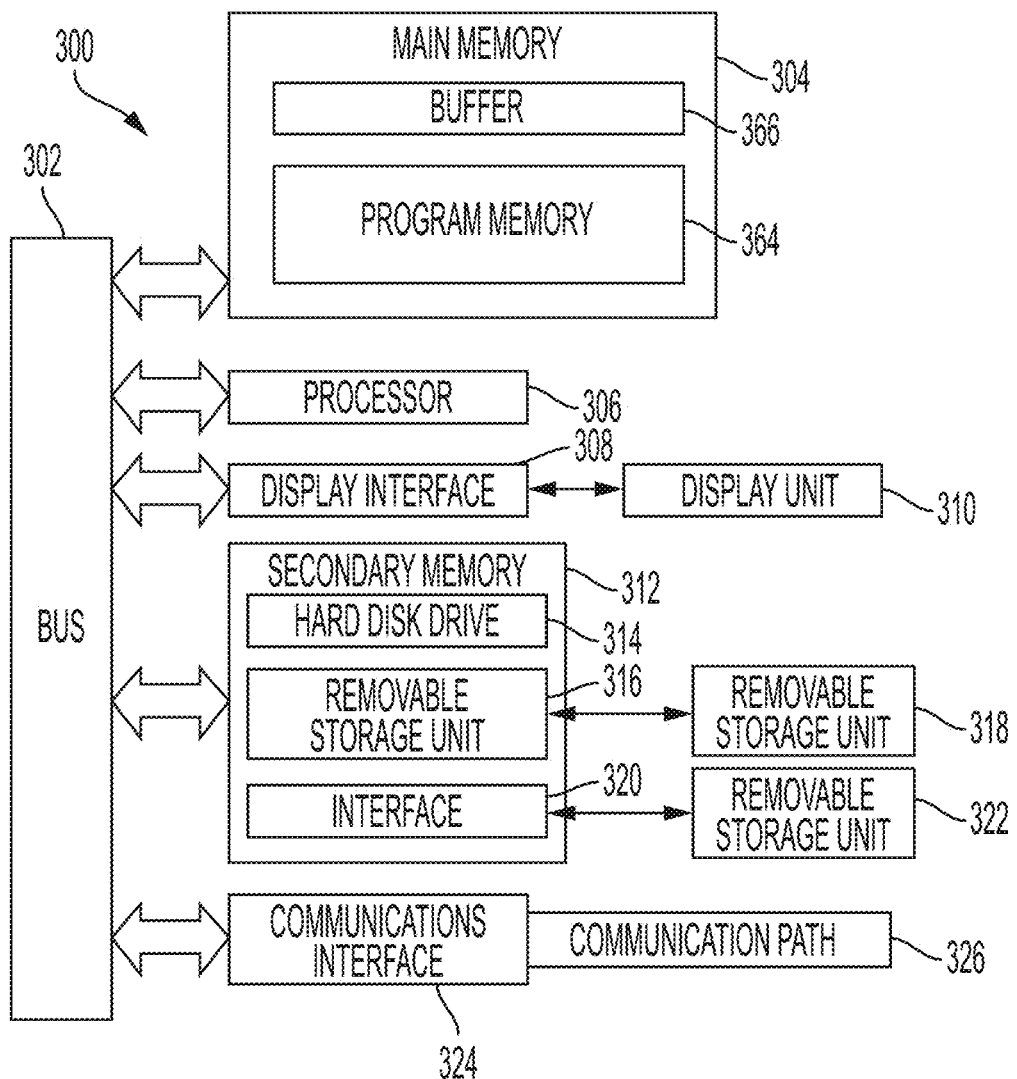
FIG. 13 illustrates a block diagram of an example digital front-end controller useful for implementing one or more of the disclosed embodiments.

FIG. 12 illustrates a block diagram of a printing system 200 suitable for implementing one or more of the disclosed embodiments. FIG. 13 illustrates a block diagram of a digital front-end 300 useful for implementing one or more of the disclosed embodiments. The printing system 200 and/or the digital front-end 300 can be used to render (e.g., print) a recording medium (e.g., a document or substrate) with the gloss effect discussed herein. In some embodiments, the digital front-end 300 shown in FIG. 13 may be used to implement the digital front-end 220 shown in FIG. 13.

With reference to FIG. 12, a printing system (or image rendering system) 200 suitable for implementing various aspects of the exemplary embodiments described herein is illustrated. The printing system 200 can implement rendering operations such as scanning a document via a scanner and printing a document via a printer, wherein the document may include the disclosed improved gloss effect. The printing system 200 can be used to implement, for example, the method 100 discussed herein with respect to FIG. 11.

Note that the term 'scanner' as utilized herein may refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features. The scanner may also be incorporated into, for example, a printing system such as the printing system 200 shown in FIG. 12. For example, the scanner 229 is depicted in FIG. 12 as a part of the printing system 200. Alternatively, or in addition to the scanner 229 included as a part of the printing system 200, a scanner 261 and/or a scanner 262 may communicate with the printing system 200 through the network 260.

The terms "printer," "print device," and "printing system" as used herein can be utilized interchangeably to refer to the same rendering device or system and can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

A "print device" or a "printing system" is an electronic device that is capable of receiving commands and/or data, and in response printing characters and/or images on a substrate. Printing devices may include, but are not limited to, network printers, production printers, copiers and other devices using ink or toner, and scanners. A print device may also perform a combination of functions such as printing and scanning, in which case such a device may be considered a multifunction device.

The printing system 200 can include a user interface 210, the digital front-end (DFE) 220, and one or more print engines such as a print engine 230. The print engine 230 may have access to print media 235 of various sizes and in some cases the cost for a print job. In some embodiments, the printing system 200 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after a job is printed by the print engine 230 to manage arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. One or more color sensors (not shown) may be embedded in the printer paper path in some embodiments.

With respect to FIG. 13, an exemplary DFE (Digital Front End) 300 is shown in greater detail. The DFE 300 can include one or more processors, such as processor 306 capable of executing machine executable program instructions. The processor 306 can function as a DFE processor. The DFE shown in FIG. 13 may be utilized as or with the digital front end 220 of the printing system 200 shown in FIG. 12. Note that the term 'processor' as utilized herein can relate a component of an electronic device that executes programming instructions. The term "processor" may refer to either a single processor or to multiple processors that together implement various steps of a process. Unless the context specifically states that a single processor is required or that multiple processors are required, the term "processor" can include both the singular and plural embodiments.

In the embodiment shown, the processor 306 can be in communication with a bus 302 (e.g., a backplane interface bus, cross-over bar, or data network). The digital front end 300 can also include a main memory 304 that is used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., which can store computer software and/or data.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 can include a communications interface 324, which can act as an input and an output interface that can allow software and data to be transferred between the digital front end controller 300 and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, can enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded but may be optionally created inside the DFE in a so-called characterization step. Part of the data stored in secondary memory 312 may also be the previously discussed transformation table.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, some embodiments may be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein. Examples of such instructions include the various steps or operations shown in the various blocks of the method 100 depicted in FIG. 11.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function (s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 12 and/or the DFE controller 300 shown in FIG. 13. A "module" can perform the various steps, operations or instructions discussed herein, such as the various steps or operations discussed with respect to FIG. 11 and elsewhere herein.

The method 100 shown in FIG. 11, for example, may be implemented, in part, in the context of a computer program product comprising a module that may be executed by, for example, the DFE controller 220 (or the DFE 300 of FIG. 13). The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 12).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed examples discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventor has realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning. The claimed solution may also involve non-abstract devices such as security devices including non-abstract features such as printed media (e.g., paper) upon which a security device (e.g., a watermark) may be rendered.

Based on the foregoing, it can be appreciated that a number of different embodiments are disclosed herein. For example, in an embodiment, a method for rendering a gloss effect on a recording medium, can involve: rendering a foreground pattern using a first ink composition comprising infrared absorbing colors, wherein said first ink is lightened with lightening parameters by the addition of paper white holes; rendering a background pattern using a second ink composition comprising a process or spot color, wherein said second ink is darkened with darkening parameters by the addition of infrared absorbing colors comprising different amounts of infrared absorbing colors than that of the first ink composition; adjusting the lightening parameters and the darkening parameters to ensure that the first and second inks appear approximately the same at printed sizes; introducing anisotropic properties to the first and second inks, causing non-uniformity in their reflection of light in different directions when viewed under a light source, thereby creating a gloss effect renderable on a recording medium; and embedding an infrared (IR) signal within the gloss effect, enabling detection of the gloss effect using an IR sensor or an IR device. Note that in the method above, only one pattern ink has K (e.g., black) in it and this is the same ink that has white paper holes.

An embodiment of the method can involve rendering the gloss effect on the recording medium.

In an embodiment of the method, the first ink can comprise micro-sized paper white holes, further enhancing the lightening effect, and wherein the second ink comprises a process or spot color that is matched to achieve a visually similar appearance at printed sizes.

An embodiment of the method can involve adjusting the lightening and darkening parameters by color matching similar to facilitate an integration of the foreground and background patterns.

In an embodiment of the method, the anisotropic properties of the first and second inks can be achieved through a manipulation of a particle size, a particle shape, or a particle orientation, resulting in distinct visual effects when under a light source.

In an embodiment of the method, the infrared absorbing colors added to the first and second inks can be selected to enhance the darkening effect of the second ink and the lightening effect of the first ink.

In an embodiment of the method, the darkening effect of the second ink and the lightening effect of the first ink can facilitate a similarity in appearance at printed sizes of the recording medium.

In an embodiment of the method, the gloss effect can be viewable by tilting a printed substrate upon which the gloss effect is rendered under a light source, which can reveal the anisotropic properties of the first and second inks.

In another embodiment, a system for rendering a gloss effect on a recording medium, can include at least one processor and a memory, the memory storing instructions to cause the at least one processor to perform: rendering a foreground pattern using a first ink composition comprising infrared absorbing colors, wherein said first ink is lightened with lightening parameters by the addition of paper white holes; rendering a background pattern using a second ink composition comprising a process or spot color, wherein said second ink is darkened with darkening parameters by the addition of infrared absorbing colors comprising different amounts of infrared absorbing colors than that of the first ink composition; adjusting the lightening parameters and the darkening parameters to ensure that the first and second inks appear approximately the same at printed sizes; introducing anisotropic properties to the first and second inks, causing non-uniformity in their reflection of light in different directions when viewed under a light source, thereby creating a gloss effect renderable on a recording medium; and embedding an infrared (IR) signal within the gloss effect, enabling detection of the gloss effect using an IR sensor or an IR device. Note that in the system described above, only one pattern ink may have K (e.g., black) therein, and this is the same ink that has white paper holes.

In an embodiment of the system, the instructions can further cause the at least one processor to perform rendering the gloss effect on the recording medium.

In an embodiment of the system, the first ink can comprise micro-sized paper white holes, which can further enhance the lightening effect, and the second ink can comprise a process or spot color that can be matched to achieve a visually similar appearance at printed sizes.

In an embodiment of the system, the instructions can further cause the at least one processor to perform adjusting the lightening and darkening parameters by color matching similar to facilitate an integration of the foreground and background patterns.

In an embodiment, the anisotropic properties of the first and second inks can be achieved through a manipulation of a particle size, a particle shape, or a particle orientation, which can result in distinct visual effects when under a light source.

In an embodiment of the system, the infrared absorbing colors added to the first and second inks can be selected to enhance the darkening effect of the second ink and the lightening effect of the first ink.

In an embodiment of the system, darkening effect of the second ink and the lightening effect of the first ink can facilitate a similarity in appearance at printed sizes of the recording medium.

In an embodiment of the system, gloss effect can be viewable by tilting a printed substrate upon which the gloss effect is rendered under a light source, which can reveal the anisotropic properties of the first and second inks.

In yet another embodiment, an apparatus for rendering a gloss effect on a recording medium, can include: a foreground pattern electronically created using a first ink composition comprising infrared absorbing colors, wherein said first ink is lightened with lightening parameters by the addition of paper white holes; a background pattern electronically created using a second ink composition comprising a process or spot color, wherein said second ink is darkened with darkening parameters by the addition of infrared absorbing colors comprising different amounts of infrared absorbing colors than that of the first ink composition, wherein the lightening parameters and the darkening parameters are adjustable to ensure that the first and second inks appear approximately the same at printed sizes; anisotropic properties introduced to the first and second inks, causing non-uniformity in their reflection of light in different directions when viewed under a light source, thereby creating a gloss effect renderable on a recording medium; and an infrared (IR) signal embedded within the gloss effect, enabling detection of the gloss effect using an IR sensor or an IR device. The gloss effect can be rendered on a recording medium. Note that in the apparatus described above, only one pattern ink may have K (e.g., black) in it and this is the same ink that has white paper holes.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering a gloss effect on a recording medium, comprising:
   rendering a foreground pattern using a first ink composition comprising infrared absorbing colors, wherein said first ink is lightened with lightening parameters by the addition of paper white holes;
   rendering a background pattern using a second ink composition comprising a process or spot color, wherein said second ink is darkened with darkening parameters by the addition of infrared absorbing colors comprising different amounts of infrared absorbing colors than that of the first ink composition;
   adjusting the lightening parameters and the darkening parameters to ensure that the first and second inks appear approximately the same at printed sizes;
   introducing anisotropic properties to the first and second inks, causing non-uniformity in their reflection of light in different directions when viewed under a light source, thereby creating a gloss effect renderable on a recording medium; and
   embedding an infrared (IR) signal within the gloss effect, enabling detection of the gloss effect using an IR sensor or an IR device.

2. The method of claim 1 further comprising rendering the gloss effect on the recording medium.

3. The method of claim 1, wherein the first ink comprises micro-sized paper white holes, further enhancing the lightening effect, and wherein the second ink comprises a process or spot color that is matched to achieve a visually similar appearance at printed sizes.

4. The method of claim 1 further comprising adjusting the lightening and darkening parameters by color matching similar to facilitate an integration of the foreground and background patterns.

5. The method of claim 1 wherein the anisotropic properties of the first and second inks are achieved through a manipulation of a particle size, a particle shape, or a particle orientation, resulting in distinct visual effects when under a light source.

6. The method of claim 1 wherein the infrared absorbing colors added to the first and second inks are selected to enhance the darkening effect of the second ink and the lightening effect of the first ink.

7. The method of claim 6 wherein the darkening effect of the second ink and the lightening effect of the first ink facilitate a similarity in appearance at printed sizes of the recording medium.

8. The method of claim 1 wherein the gloss effect is viewable by tilting a printed substrate upon which the gloss effect is rendered under a light source, revealing the anisotropic properties of the first and second inks.

9. A system for rendering a gloss effect on a recording medium, comprising:
   at least one processor and a memory, the memory storing instructions to cause the at least one processor to perform
      rendering a foreground pattern using a first ink composition comprising infrared absorbing colors, wherein said first ink is lightened with lightening parameters by the addition of paper white holes;
      rendering a background pattern using a second ink composition comprising a process or spot color, wherein said second ink is darkened with darkening parameters by the addition of infrared absorbing colors comprising different amounts of infrared absorbing colors than that of the first ink composition;
      adjusting the lightening parameters and the darkening parameters to ensure that the first and second inks appear approximately the same at printed sizes;
      introducing anisotropic properties to the first and second inks, causing non-uniformity in their reflection of light in different directions when viewed under a light source, thereby creating a gloss effect renderable on a recording medium; and
      embedding an infrared (IR) signal within the gloss effect, enabling detection of the gloss effect using an IR sensor or an IR device.

10. The system of claim 9 wherein the first ink comprises micro-sized paper white holes, further enhancing the lightening effect, and wherein the second ink comprises a process or spot color that is matched to achieve a visually similar appearance at printed sizes.

11. The system of claim 9 wherein the instructions further cause the at least one processor to perform adjusting the lightening and darkening parameters by color matching similar to facilitate an integration of the foreground and background patterns.

12. The system of claim 9 wherein the anisotropic properties of the first and second inks are achieved through a manipulation of a particle size, a particle shape, or a particle orientation, resulting in distinct visual effects when under a light source.

13. The system of claim 9 wherein the infrared absorbing colors added to the first and second inks are selected to enhance the darkening effect of the second ink and the lightening effect of the first ink.

14. The system of claim 13 wherein the darkening effect of the second ink and the lightening effect of the first ink facilitate a similarity in appearance at printed sizes of the recording medium.

15. The system of claim 9 wherein the gloss effect is viewable by tilting a printed substrate upon which the gloss effect is rendered under a light source, revealing the anisotropic properties of the first and second inks.

16. An apparatus for rendering a gloss effect on a recording medium, comprising:
    a foreground pattern electronically created using a first ink composition comprising infrared absorbing colors, wherein said first ink is lightened with lightening parameters by the addition of paper white holes;
    a background pattern electronically created using a second ink composition comprising a process or spot color, wherein said second ink is darkened with darkening parameters by the addition of infrared absorbing colors comprising different amounts of infrared absorbing colors than that of the first ink composition, wherein the lightening parameters and the darkening parameters are adjustable to ensure that the first and second inks appear approximately the same at printed sizes;
    anisotropic properties introduced to the first and second inks, causing non-uniformity in their reflection of light in different directions when viewed under a light source, thereby creating a gloss effect renderable on a recording medium; and
    an infrared (IR) signal embedded within the gloss effect, enabling detection of the gloss effect using an IR sensor or an IR device.

17. The apparatus of claim 16 further comprising rendering the gloss effect on the recording medium.

18. The apparatus of claim 16 wherein the first ink comprises micro-sized paper white holes, further enhancing the lightening effect, and wherein the second ink comprises a process or spot color that is matched to achieve a visually similar appearance at printed sizes.

19. The apparatus of claim 16 wherein the lightening and darkening parameters are further adjustable by color matching similar to facilitate an integration of the foreground and background patterns.

20. The apparatus of claim 16 wherein the anisotropic properties of the first and second inks are achieved through a manipulation of a particle size, a particle shape, or a particle orientation, resulting in distinct visual effects when under a light source.

* * * * *